United States Patent
Lee et al.

(10) Patent No.: US 10,536,958 B2
(45) Date of Patent: Jan. 14, 2020

(54) RESOURCE SELECTION METHOD FOR V2X OPERATION OF TERMINAL IN WIRELESS COMMUNICATION SYSTEM, AND TERMINAL USING METHOD

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/760,604

(22) PCT Filed: Sep. 19, 2016

(86) PCT No.: PCT/KR2016/010432
§ 371 (c)(1),
(2) Date: Mar. 15, 2018

(87) PCT Pub. No.: WO2017/048109
PCT Pub. Date: Mar. 23, 2017

(65) Prior Publication Data
US 2019/0045526 A1    Feb. 7, 2019

Related U.S. Application Data

(60) Provisional application No. 62/219,086, filed on Sep. 15, 2015.

(51) Int. Cl.
*H04L 12/801* (2013.01)
*H04L 5/14* (2006.01)
(Continued)

(52) U.S. Cl.
CPC ...... *H04W 72/1263* (2013.01); *H04B 17/327* (2015.01); *H04L 1/18* (2013.01);
(Continued)

(58) Field of Classification Search
CPC ...... H04W 4/40; H04W 98/18; H04L 5/0048; H04L 5/0044
See application file for complete search history.

(56) References Cited

U.S. PATENT DOCUMENTS

2014/0187283 A1*  7/2014  Nimbalker .......... H04W 72/048
                                                                455/550.1
2014/0206343 A1*  7/2014  Immendorf ............ H04K 3/226
                                                                455/423

(Continued)

FOREIGN PATENT DOCUMENTS

JP    2015162877    9/2015
WO    2014107091    7/2014

OTHER PUBLICATIONS

3GPP TSG RAN WG1 Meeting #82 (R1-154599), Publication date, Aug. 24-28, 2015 (Year: 2015).*

(Continued)

*Primary Examiner* — Brian S Roberts
*Assistant Examiner* — Abusayeed M Haque
(74) *Attorney, Agent, or Firm* — Lee Hong Degerman Kang & Waimey

(57) ABSTRACT

Provided are a resource selection method for a vehicle-to-everything (V2X) operation of a terminal in a wireless communication system, and a terminal using the method. The method comprises: monitoring physical sidelink control channels (PSCCHs) for other terminals in a first subframe; and transmitting, in a second subframe, a V2X message by using a resource which is not overlapped with a resource scheduled by the PSCCH for another terminal.

6 Claims, 11 Drawing Sheets

(51) Int. Cl.
*H04W 84/18* (2009.01)
*H04L 1/00* (2006.01)
*H04W 72/12* (2009.01)
*H04L 1/18* (2006.01)
*H04B 17/327* (2015.01)
*H04W 4/40* (2018.01)
*H04W 72/02* (2009.01)
*H04W 92/18* (2009.01)

(52) U.S. Cl.
CPC ............ *H04W 4/40* (2018.02); *H04W 72/02* (2013.01); *H04W 72/1289* (2013.01); *H04W 92/18* (2013.01)

(56) References Cited

U.S. PATENT DOCUMENTS

| | | | |
|---|---|---|---|
| 2015/0318946 A1* | 11/2015 | Abdelnnonenn; Amr | H04L 5/006 370/252 |
| 2015/0327240 A1* | 11/2015 | Yamada | H04W 72/02 455/426.1 |
| 2015/0341794 A1* | 11/2015 | Vanderveen | G06Q 30/0261 705/14.58 |
| 2016/0066337 A1* | 3/2016 | Sartori | H04W 76/14 370/329 |
| 2016/0073408 A1* | 3/2016 | Sartori | H04W 72/0453 370/329 |
| 2016/0330729 A1* | 11/2016 | Wei | H04W 52/244 |
| 2017/0013605 A1* | 1/2017 | Li | H04W 76/14 |
| 2017/0064638 A1* | 3/2017 | Li | H04W 52/10 |
| 2017/0188320 A1* | 6/2017 | Xiong | H04W 72/044 |
| 2017/0230939 A1* | 8/2017 | Rudolf | H04W 72/04 |

OTHER PUBLICATIONS

3GPP TSG-RAN WG-1 Meeting#82 (R1-154730), publication date, Aug. 24-28, 2018 (Year: 2015).*

PCT International Application No. PCT/KR2016/010432, Written Opinion of the International Searching Authority dated Dec. 14, 2016, 4 pages.

ZTE, "Discussions on different priorities for D2D communication," 3GPP TSG-RAN WG1 #82, R1-154052, Aug. 2015, 6 pages.

Huawei, "Discussion on group priority for D2D communication," 3GPP TSG-RAN WG1 #82, R1-154339, Aug. 2015, 6 pages.

Alcatel-Lucent, "Support for PC5 priority," 3GPP TSG-RAN WG1 #82, R1-154599, Aug. 2015, 5 pages.

InterDigital Communications, "Support of different priorities for D2D communication," 3GPP TSG-RAN WG1 #82, R1-154730, Aug. 2015, 7 pages.

Japan Patent Office Application No. 2018-533600, Office Action dated Jan. 22, 2019, 4 pages.

Intel, "Sensing based collision avoidance schemes for V2V communication", 3GPP TSG RAN WG1 Meeting #84, R1-160432, Feb. 2016, 9 pages.

Huawei, et al., "Discussion on sensing details for measurement and reservation", 3GPP TSG RAN WG1 Meeting #85, R1-164102, May 2016, 5 pages.

Nokia, "Discussion on interruption requirements for ProSe Direct Communication", 3GPP TSG RAN WG4 Meeting #74bis, R4-151917, Apr. 2015, 4 pages.

Japan Patent Office Application No. 2018-533600, Office Action dated Jun. 4, 2018, 3 pages.

Fujitsu, "RRM for D2D communication," 3GPP TSG-RAN1 #76bis, R1-141230, Shenzhen, China, Mar. 31-Apr. 4, 2014, 6 pages.

Huawei et al., "Mode 2 resource allocation for D2D," 3GPP TSG RAN WG1 Meeting #78, R1-142839, Dresden, Germany, Aug. 18-22, 2014, 6 pages.

European patent application No. 16846930.2, European search report dated Jun. 14, 2019, 7 pages.

Ericsson, "Remaining Details of D2D Link Measurements Procedures," 3GPP TSG-RAN WG1 Meeting #82, R1-154437, Beijing, P.R. China, Aug. 24-28, 2015, 3 pages.

Japan Patent Office Application No. 2018-533600, Office Action dated Sep. 24, 2019, 3 pages.

* cited by examiner

RESOURCE SELECTION METHOD FOR V2X OPERATION OF TERMINAL IN WIRELESS COMMUNICATION SYSTEM, AND TERMINAL USING METHOD

CROSS-REFERENCE TO RELATED APPLICATIONS

This application is the National Stage filing under 35 U.S.C. 371 of International Application No. PCT/KR2016/010432, filed on Sep. 19, 2016, which claims the benefit of U.S. Provisional Application No. 62/219,086, filed on Sep. 15, 2015, the contents of which are all hereby incorporated by reference herein in its entirety.

BACKGROUND OF THE INVENTION

Field of the invention

The present invention relates to a method for selecting a resource for v2x operation by a wireless device in a wireless communication system, and to a wireless device performing the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, the D2D operation may also be applied to vehicle-to-everything (V2X) communication. The V2X communication refers to communication technology with vehicles via all interfaces. Embodiments of V2X include, for example, vehicle-to-vehicle (V2V), vehicle-to-infrastructure (V2I), vehicle-to-person (V2P) communications, and the like.

When a first wireless device performs V2X communication with a second wireless device, and if the second wireless device also transmits a signal using the same or partially overlapped resource as that used by the first wireless device, this may cause mutual interference, and, thus, reliable V2X communication will be difficult to perform. For example, resources for V2X communication are supplied in the form of a resource pool. In fact, resources used to perform V2X communication may be selected from the resource pool by wireless devices. In this case, because different wireless devices arbitrarily choose their own resources from the same resource pool, the same or partially overlapping resources from each other may be selected by the different wireless devices.

Thus, a method for efficiently selecting resources for V2X operation and a wireless device performing the above method are needed.

SUMMARY OF THE INVENTION

The present invention provides a method for selecting a resource for a V2X operation by a wireless device in a wireless communication system and a wireless device configured to perform the method.

In one aspect, provided is a method for performing a vehicle-to-everything (V2X) operation by a user equipment (UE) in a wireless communication system. The method includes monitoring a physical sidelink control channel (PSCCH) for an another UE on a first subframe and transmitting a V2X message using a resource that does not overlap with a resource scheduled by the PSCCH for the another UE on a second subframe.

The UE may receive, from a network, information on a PSCCH subframe pool indicating subframes where the UE can transmit the PSCCH.

The second subframe may be included in the subframes indicated by the information on the PSCCH subframe pool.

The UE may monitor a PSCCH for the another UE as moving a basic resource unit composed of at least one subframe by one subframe.

The UE may monitor an idle resource unit that does not overlap with a resource scheduled by the PSCCH for the another UE.

When a plurality of idle resource units are detected, the UE may select one idle resource unit among the plurality of idle resource units and transmits a PSCCH.

In another aspect, provided is a user equipment (UE) for performing a vehicle-to-everything (V2X) operation in a wireless communication system. The UE includes a RF (radio frequency) unit configured to transmit and receive a RF signal and a processor operatively coupled to the RF unit. The processor monitors a physical sidelink control channel (PSCCH) for an another UE on a first subframe and transmits a V2X message using a resource that does not overlap with a resource scheduled by the PSCCH for the another UE on a second subframe.

In accordance with the present disclosure, while a wireless device moves a resource region called a basic resource unit along a temporal region, the wireless device monitors whether another wireless device uses resources in the basic resource unit. Thus, the device detects and uses idle resource units that are not used by said another wireless device, interference with said another wireless device can be reduced. Further, when a plurality of idle resource units are"

detected by the device and said another wireless device may also use the plurality of idle resource units, the device may choose a specific idle resource unit while avoiding resource-collision with said another wireless device. This increases the reliability of the V2X operation and the efficiency of resource usage.

DESCRIPTION OF EXEMPLARY EMBODIMENTS

Figure 1:
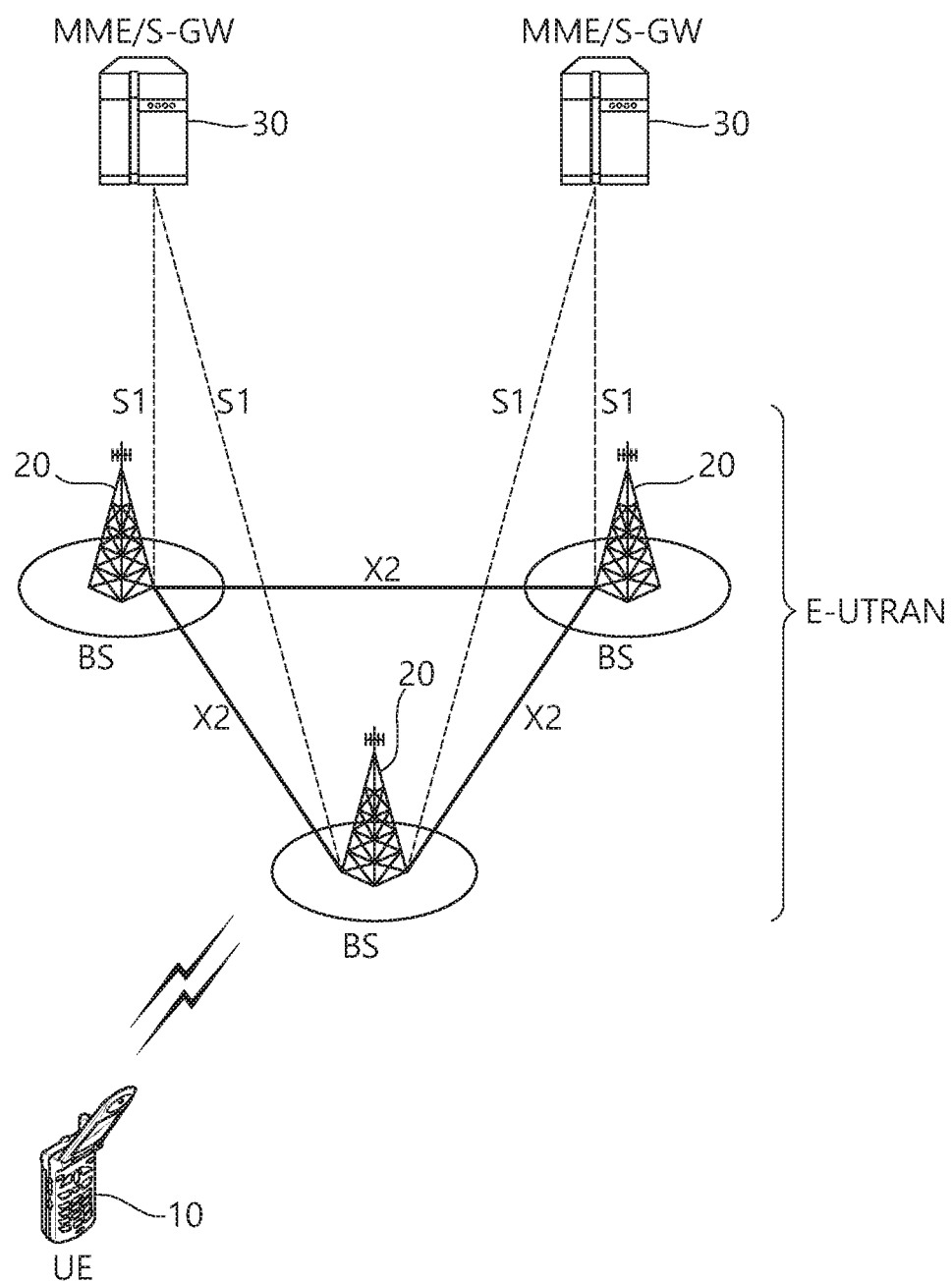
FIG. 1 shows a wireless communication system to which the present invention is applied.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
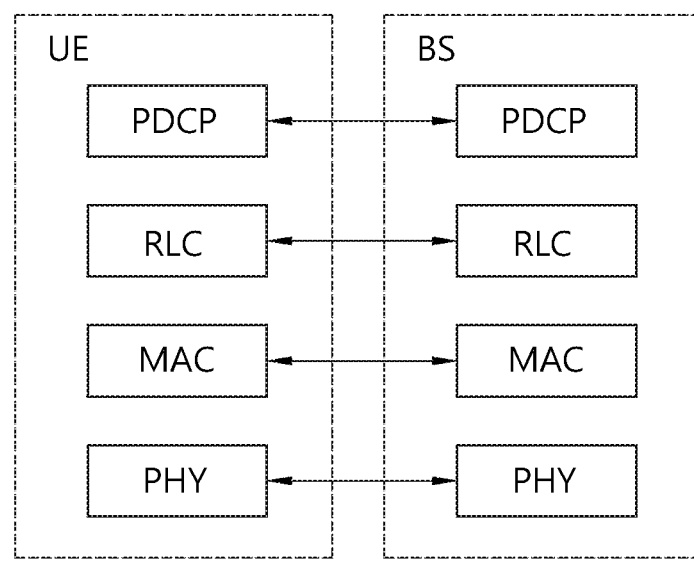
FIG. 2 is a diagram showing a wireless protocol architecture for a user plane.
Figure 3:
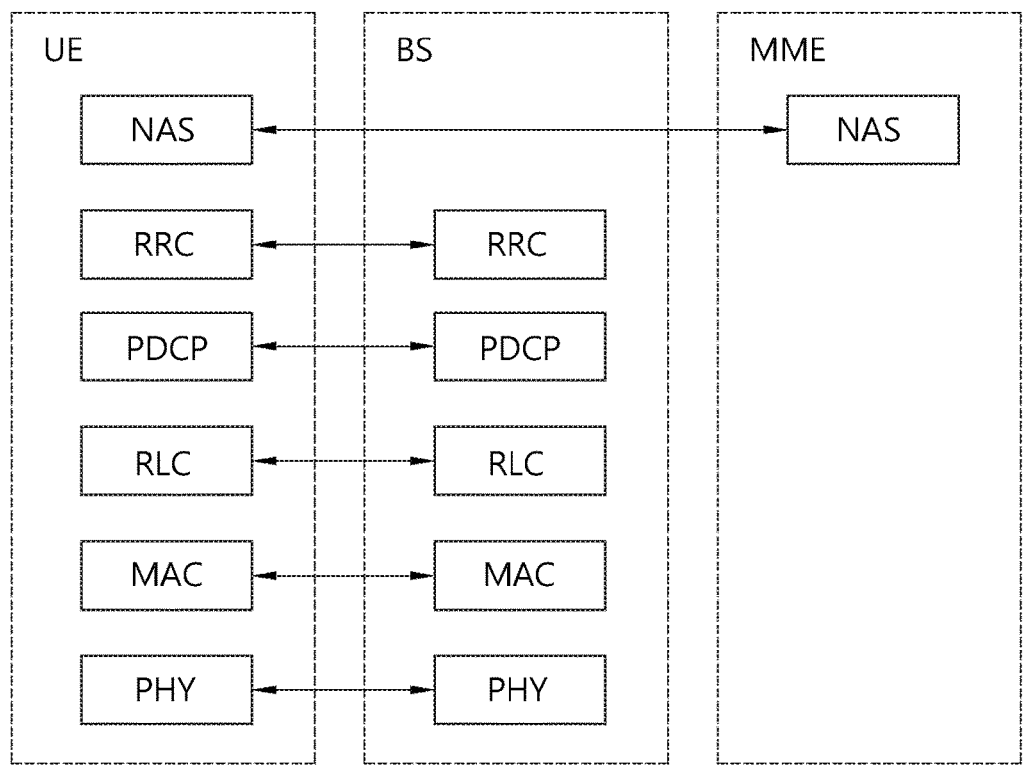
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
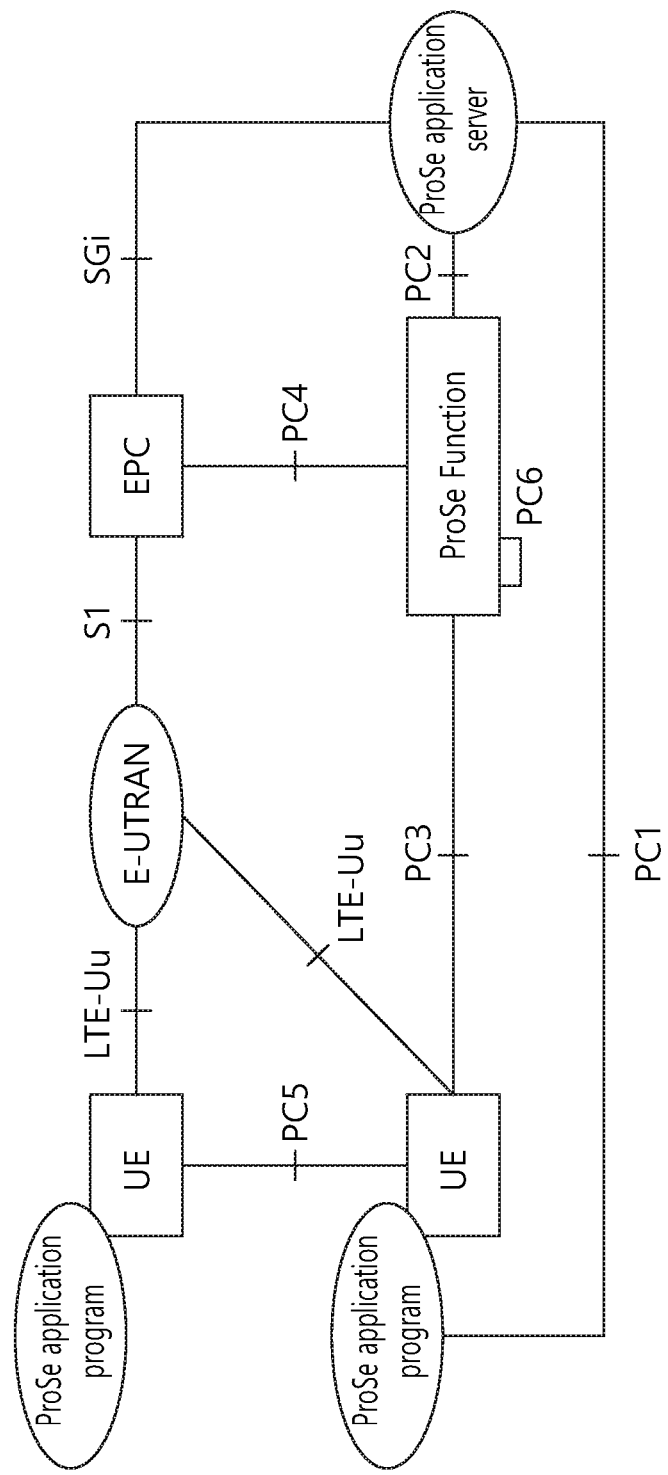
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.
- Interworking via a reference point toward the 3rd party applications
- Authorization and configuration of UE for discovery and direct communication
- Enable the functionality of EPC level ProSe discovery
- ProSe related new subscriber data and handling of data storage, and also handling of the ProSe identities
- Security related functionality
- Provide control towards the EPC for policy related functionality
- Provide functionality for charging (via or outside of the EPC, e.g., offline charging)

A reference point and a reference interface in the basic structure for ProSe are described below.
- PC1: a reference point between the ProSe application program within the UE and the ProSe application program within the ProSe APP server. This is used to define signaling requirements in an application dimension.
- PC2: a reference point between the ProSe APP server and the ProSe function. This is used to define an interaction between the ProSe APP server and the ProSe function. The update of application data in the ProSe database of the ProSe function may be an example of the interaction.
- PC3: a reference point between the UE and the ProSe function. This is used to define an interaction between the UE and the ProSe function. A configuration for ProSe discovery and communication may be an example of the interaction.
- PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
- PC5: a reference point used for using control/user plane for discovery and communication, relay, and 1:1 communication between types of UE.
- PC6: a reference point for using a function, such as ProSe discovery, between users belonging to different PLMNs.
- SGi: this may be used to exchange application data and types of application dimension control information.

The D2D operation may be supported both when UE is serviced within the coverage of a network (cell) or when it is out of coverage of the network.

Figure 5:
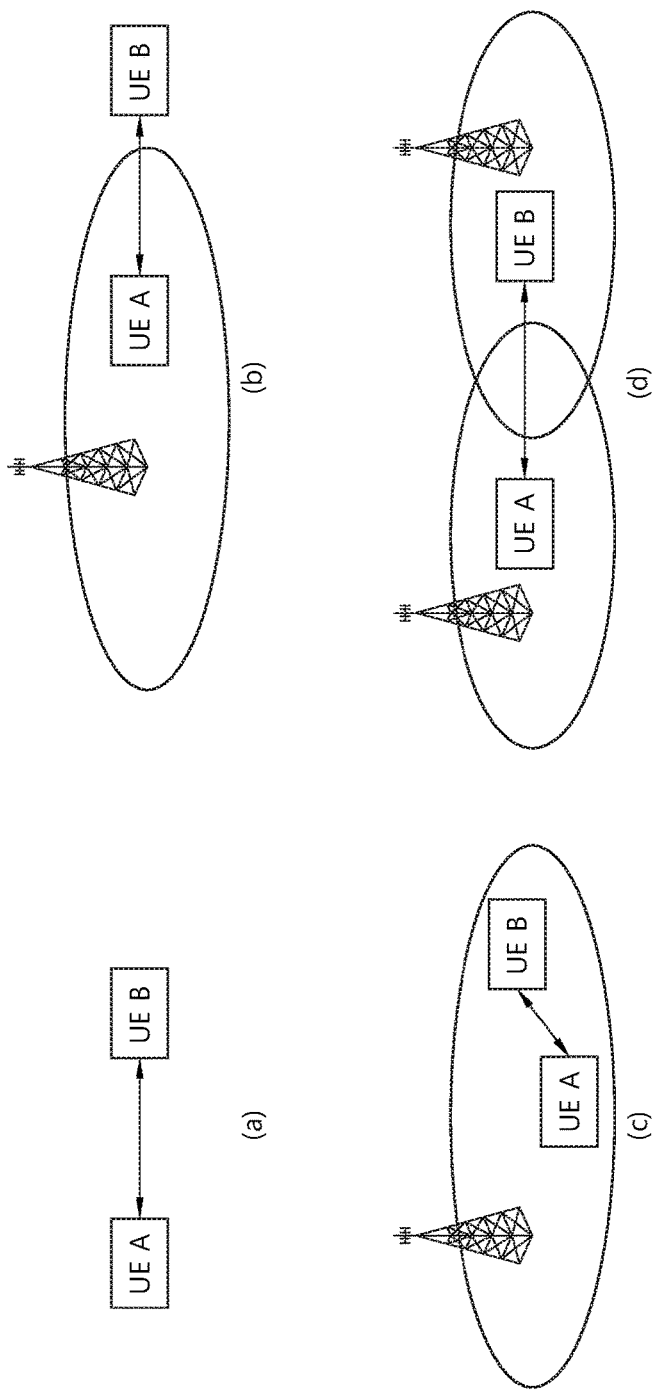
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell.

ProSe direct communication may be performed between types of UE placed at various positions as in FIG. 5.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

A PC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Now, the present invention will be described. The above-described D2D operation may also be applied to a V2X (VEHICLE-TO-EVERYTHING, VEHICLE-TO-X) operation.

In V2X operation, 'X' may be a pedestrian. In this case, V2X can be represented as V2P. The V2P communications refers to the communication between a vehicle (or a wireless device installed in a vehicle) and a person-carrying device. The term "person-carrying device" may refer to a wireless device carried by the pedestrian, a wireless device held by a cyclist, and a wireless device that a driver of a slow moving vehicle carries.

Alternatively, X may be a vehicle. In this case, V2X may be represented as V2V. Alternatively, X may be an infrastructure or a network. In this case, V2X may be represented as V2I and V2N, respectively. The infrastructure includes a roadside unit (RSU) to indicate speed, and a device to indicate the traffic environment. The infrastructure may operate as a base station or operate as a wireless device.

Hereinafter, for convenience of explanation of the schemes proposed by the present invention, a V2P communication-related device possessed by a pedestrian is referred to as a P-UE, while a V2X communication-related device installed in the vehicle is referred to as a V-UE. The 'entity' may be interpreted as P-UE and/or V-UE and/or RSU (or network/infrastructure).

Hereinafter, a wireless device transmitting a V2X message may be referred to as a V2X TX UE or a V2X transmission wireless device. The schemes proposed below present a method for allowing different wireless devices transmitting V2X messages to efficiently select V2X transmission resources from a pre-defined or pre-signaled V2X transmission resource pool (V2X TX resource pool). In other words, in one example, a V2X transmission wireless device may arbitrarily select a V2X transmission resource from a configured (signaled) V2X transmission resource pool and transmit a V2X message using the selected V2X transmission resource. The V2X message may be, for example, a D2D discovery message, a D2D communication message, or the like.

In the present disclosure, the term "energy sensing (or detection)" may refer to RSRP measurement operation for a pre-configured or pre-signaled reference signal (for example, DMRS) on the PSSCH resource region scheduled by the PSCCH as blind-decoded or blind-detected; and/or, to measurement of a linear average of RSSI (for symbols) on a pre-configured or pre-signaled resource unit (or region) (for example, basic resource unit).

Applying the present invention can reduce the probability that different V2X transmission wireless devices may transmits V2X messages using V2X transmission resources partially or wholly overlapping each other.

In the present invention, while a V2X transmission wireless device slides or move a basic resource unit having a size or window as pre-defined or signaled from a network or a serving base station, from a specific timing (e.g., subframe#N, as denoted SF#), the V2X transmission wireless device may define V2X transmission resource candidates related to V2X message transmission. Here, the V2X transmission wireless device may be interpreted as carrying out its own V2X (data and/or control) message transmission using the corresponding basic resource unit (as pre-configured or pre-signaled).

Here, a basic resource unit (or window) may be composed of combinations of temporal region resources (for example, subframe, slot, symbol) and/or frequency region resources (for example, physical resource blocks (pairs), subcarriers). For example, a basic resource unit may be composed of N subframes, and N may be a natural number of 1 or more. For example, the basic resource unit may be composed of one subframe and a plurality of physical resource blocks (PRBs) configured or signaled in advance. For example, the sliding size may be configured (or signaled) to be equal to the number of subframes constituting the basic resource unit.

Figure 6:
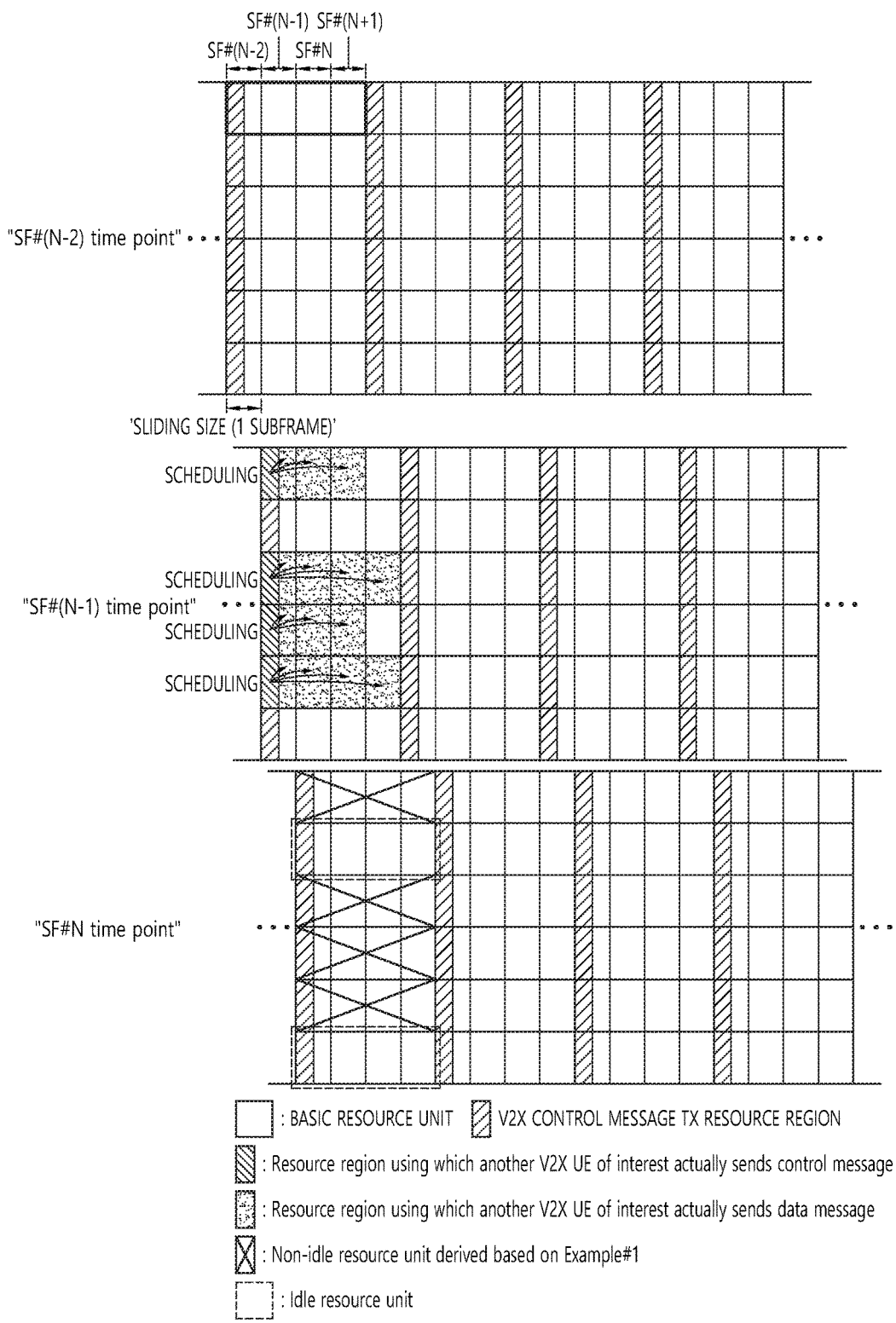
FIGS. 6 and 7 show examples of defining V2X transmission resource candidates while sliding the basic resource unit.
Figure 7:
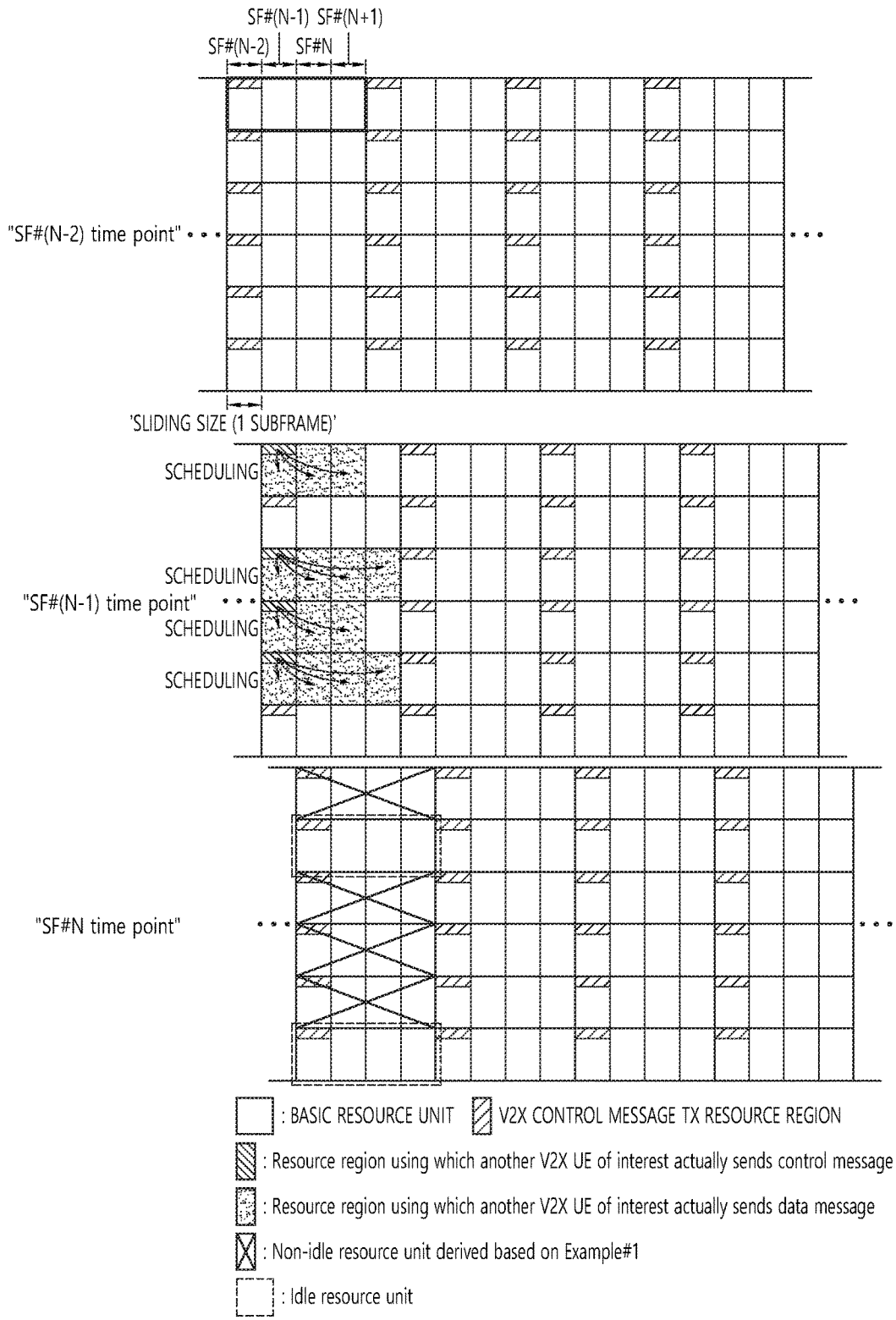

FIGS. 6 and 7 show examples of defining V2X transmission resource candidates while sliding the basic resource unit.

FIG. 6 is an example of a case where a V2X control message transmission resource region and a V2X data message transmission resource region are implemented in a TDM form. FIG. 7 is an example of a case where a V2X control message transmission resource region and a V2X data message transmission resource region are implemented in a FDM form.

In FIG. 6 and FIG. 7, the basic resource unit is composed of four consecutive subframes. In this connection, in one example, a unit by which the basic resource unit is moved is defined as a sliding size. In FIG. 6 and FIG. 7, it is assumed that the sliding size is one subframe.

The sensing (or monitoring) window (size) of the V2X transmission wireless device may be configured (or signaled) as: 1) an interval from SF#(N−K) to SF#(N−1) (for example, K value is a positive integer equal to or greater than 1, and setting the interval in this way is called option#A); and/or 2) an interval from SF#(N−K1) to SF#(N−K2) (for example, 'K1' and 'K2' are positive integers greater than or equal to 1, and setting the interval in this way is called option#B; for example, in that K2 is not fixed to 1, the option#B differs from option#A) taking into further consideration of the decoding/encoding delay (which may be interpreted as including times related to, for example, sensing/detection operation, and/or its own (optimal) transmission resource selection operation based on the sensing/detection operation, and/or V2X message-related processing). In this connection, in one example, a V2X transmission wireless device may perform blind decoding (or detection) for a V2X control message (information) from another V2X transmission wireless device, and for (V2X) data resource-related information scheduled by the corresponding V2X control message, in a V2X control message transmission resource region (named "CTL_REGION") belonging to the corresponding sensing or monitoring.

Additionally and alternatively, using the blind decoding (or detection) operation (within the sensing (or monitoring) window described above), the V2X transmission wireless device acquires another V2X transmission wireless device-related V2X control message (information) and (V2X) data resource region information scheduled by the corresponding V2X control message, and, subsequently, the V2X transmission wireless device may also perform an energy detection (sensing) operation for the V2X transmission data resource (or subframe) region of another V2X device with the V2X control message as blind decoded or detected in a time interval and/or resource region (for example, a subframe (resource) interval as exemplified in option#A or option#B) as pre-defined or signaled from the network or the serving base station.

In one example, it may be assumed in FIG. 6 and FIG. 7, the resource region (or size/unit), which is used by the V2X transmission wireless device to perform the following operations: sensing (or detection) operation (for example, another V2X transmission wireless device-related V2X control message blind decoding/detection operation), energy detection/sensing operation) (for the V2X data transmission resource region that the corresponding V2X control message schedules) may be the same as the basic resource unit (size) used for V2X data and/or control message transmission.

In one example, after the sensing (or detection) operation, the V2X transmission wireless device may determine whether to perform the final V2X message transmission at the time of SF#N based on absence or presence and/or, if any, a number of an idle basic resource unit(s) (or idle resource unit(s)) satisfying the following additional conditions or all conditions at the time of SF#N. In this connection, in one example, the corresponding idle resource unit (candidate) selection or decision operation may include excluding a transmission resource candidate in which a partial or complete collision or overlap may occur between different V2X TX wireless devices at a relatively high probability from the entire transmission resource candidate. In this connection, in one example, the V2X transmission wireless device may perform a blind decoding/detection operation for another V2X transmission wireless device-related V2X control message in 'CTL_REGION' belonging to the pre-defined or signaled time/resource interval prior to 'SF#N'. In other words, in one example, the V2X transmission wireless device may perform the corresponding sensing/detection operation to monitor another wireless device-related V2X control message. In this way, in one example, in the subsequent time/resource interval including 'SF#N', the V2X transmission wireless device may be able to identify information about the resources used for V2X data message transmission by another V2X transmission wireless device of interest, for example, the location/number of subframes or resource blocks, and/or the number of repeated transmissions thereof.

The 'K' and/or 'K1' and/or 'K2' values may be pre-defined or signaled from the network or serving base station.

In FIGS. 6 and 7, it may be considered that the value of 'K' and/or 'K1' and/or 'K2' is set to '1'.

In other words, in one example, the V2X transmission wireless device that performs V2X message transmission on subframe#N monitors another wireless device-related V2X control message on subframe#N−1. The V2X transmission wireless device may identify the location/number of resources used for V2X message transmission by said another wireless device and/or repeated transmission number thereof in the subsequent subframe/resources including subframe#N. As a result, the V2X transmission wireless device determines a resource that is not used by said another wireless device as its idle resource unit candidate.

The idle resource unit candidate described above may be selected or determined according to whether one or both of the following two exemplary conditions are satisfied.

(Example#1) In one example, (while the V2X transmission device performs blind decoding or detection on another V2X transmission wireless device-related V2X control message within the sensing/monitoring window described above), the V2X transmission device may determine as an idle resource unit candidate a basic resource unit that does not partially or wholly overlap with the resources used for V2X data and/or control message transmission by said another V2X transmission wireless device of interest.

(Example#2) In one example, (on another V2X transmission wireless device-related V2X data transmission resource/subframe regions according to the blind-decoded or blind-detected V2X control message) the V2X transmission device may determine as an idle resource unit (candidate) a basic resource unit for which detected/sensed energy has an (average) value less than a (average) threshold as pre-defined or signaled (from the network or serving base station).

In FIGS. 6 and 7, in one example, the total number of basic resource units, i.e., idle resource units, satisfying the condition of the Example#1 at the time of SF#N is two.

On the other hand, when option#B is applied, the V2X transmission wireless device may not be able to perform a blind decoding or detection operation in the CTL_REGION belonging to the interval from SF#(N−K2+1) to SF#(N−1) in consideration of decoding/encoding delay. The decoding/encoding delay may include, for example, sensing/detection operation delay time, and/or optimal transmission resource selection operation delay time according to the detection/detection operation result, and/or V2X message-related processing time. Therefore, the V2X transmission wireless device performs blind decoding in 'CTL_REGION' belonging to the interval from SF#(N−K1) to SF#(N−K2). Then, the V2X transmission wireless device adds the pre-defined or signaled offset value OFF_VAL to the number M of idle resource units at the SF#N time point derived via such blind decoding, thereby to calculate/derive the number M+OFF_VAL of idle resource units at the SF#N time point.

Using the application of these rules, the change of the number of idle resource units at the SF#N time point may be reflected to some extent due to the V2X control and/or data message transmission by another V2X transmission wireless device of interest as occurs in the interval from SF#(N−K2+1) to SF#(N−1), that is, in the CTL_REGION region where blind decoding is not performed.

Figure 8:
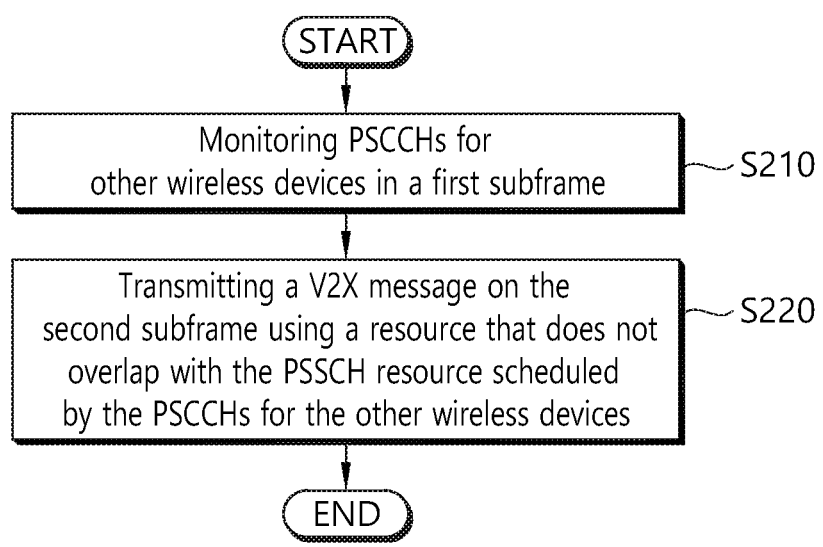
FIG. 8 illustrates a method for selecting a resource for a V2X operation by a wireless device, according to one embodiment of the present disclosure.

FIG. 8 illustrates a method for selecting a resource for a V2X operation by a wireless device, according to one embodiment of the present disclosure.

Referring to FIG. 8, the wireless device monitors PSCCHs for other wireless devices in a first subframe S210. The PSCCH (physical sidelink control channel) means the control channel of the side link between the wireless devices. In this connection, the first subframe may be a subframe belonging to the basic resource unit as described in FIGS. 6 and 7. Also, the first subframe may be a subframe before the second subframe on which the wireless device performs the V2X transmission.

The wireless device transmits a V2X message on the second subframe using a resource that does not overlap with the PSSCH resource scheduled by the PSCCHs for another wireless device, that is, using an idle resource unit S220.

Figure 9:
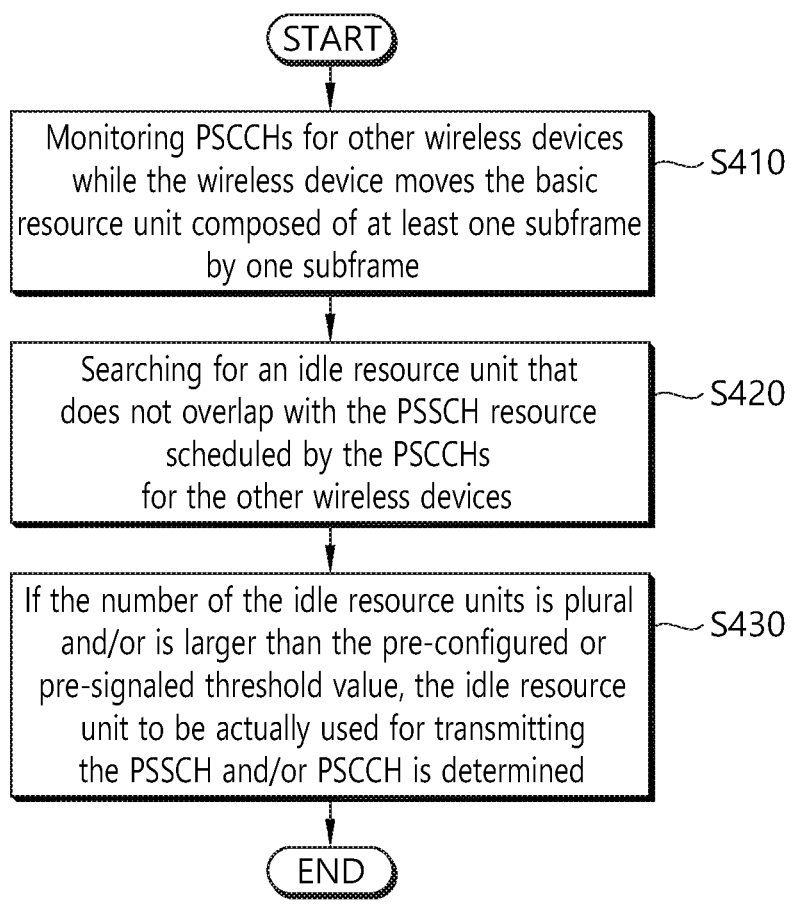
FIG. 9 shows a specific example in which a wireless device selects a resource for a V2X operation.

FIG. 9 shows a specific example in which a wireless device selects a resource for a V2X operation.

Referring to FIG. 9, while the wireless device moves the basic resource unit composed of at least one subframe by one subframe, the wireless device monitors PSCCHs for other wireless devices at step S410.

The wireless device searches for an idle resource unit that does not overlap with the PSSCH resource scheduled by the PSCCHs for the other wireless devices, that is, searches S420. If the number of the idle resource units is plural and/or is larger than the pre-configured or pre-signaled threshold value, the idle resource unit to be actually used for transmitting the PSSCH and/or PSCCH is determined S430.

Although the above rules (for example, Example#1, Example#2) are applied, the location and/or number of idle resource units assumed by different V2X transmission wireless devices may be the same at specific point SF#N. In this case, different V2X wireless devices may transmit V2X messages using the same idle resource unit, in which case resource conflicts may occur. Additional methods may be needed to lower the probability that the device selects, among the plurality of idle resource units, an idle resource unit which is partially or wholly overlapped with a V2X transmission resource used by another wireless device, when the V2X transmission wireless device finally chooses a V2X transmission resource. The methods#1 to #5 proposed below propose these methods to lower the probability. Hereinafter, for the sake of convenience of explanation, the situation of FIG. 6 or FIG. 7 is assumed.

[Suggested method#1] The V2X transmission wireless device may be configured to perform the following operations: the probability that the V2X transmission and/or data message transmission will actually be performed by the V2X transmission wireless device on a specific subframe SF#N may vary based on the number of idle resource unit candidates in the corresponding subframe SF#N identified according to the above Example#1 and/or Example#2. For example, transmission probability value P per an idle resource unit candidate may be configured or signaled. If there are 'M' idle resource unit candidates in SF#N subframe, the wireless device may be configured to determine whether the V2X control and/or data message transmission may be performed on the corresponding subframe SF#N at probability of P*M.

In one example, when the calculated value of 'P*M' is larger than '1', the wireless device may be configured such that the V2X control and/or data message transmission may performed on the 'SF#N' subframe at a probability of '1'.

When the above [proposed method#1] is applied, in one example, if the V2X transmission wireless device actually performs V2X control and/or data message transmission on the 'SF#N' subframe, the wireless device may be configured to randomly select one of the 'M' idle resource units, and/or to randomly select one of the idle resource units having a relatively small average detected/sensed energy value among the 'M' idle resource units.

When the above defined [suggested method#1] is applied, in one example, a V2X transmission wireless device may be configured as follows; if the 'idle resource unit' does not exist in 'SF#N' subframe, V2X control and/or data message transmission may be omitted. Additionally or alternatively, one of all the basic resource units of the corresponding subframe SF#N may be randomly selected and V2X control and/or data message transmission may be performed using this selected resource unit. Additionally or alternatively, one of the resource units having a relatively small average detected/sensed energy value among all the basic resource units in the corresponding subframe SF#N may randomly selected and the V2X control and/or data message transmission may be performed using the selected one.

In the above [suggested method#1], the transmission probability value per an idle resource unit may be configured or signaled independently or partially or completely differently.

For example, there are three idle resource units (for example, idle resource unit#0, idle resource unit#1, idle resource unit#2) in the SF#N subframe, and the idle resource unit#0, idle resource unit#1 and idle resource unit#2 are configured or signaled, respectively to have the probability values of P1, P2, P3. In this connection, the V2X transmission wireless device finally determines whether to perform the V2X control and/or data message transmission on the corresponding subframe SF#N with the probability of P1+P2+P3.

In another example, when the [suggested method#1] described above is applied, the transmission probability values per an idle resource unit may be configured or signaled partially or completely differently or independently between V2X messages/ information/service types, and/or V2X signals/ channels with different priorities.

The transmission probability value per an idle resource unit may be configured or signaled to be relatively higher with respect to information on incident occurrence and/or event occurrence-based information or V2X synchronization signal with relatively high priority than with respect to other information or other V2X signal/channel with low priority.

[Suggested method#2] The transmission probability value P per an idle resource unit may be configured or signaled for the V2X transmission wireless device. The V2X transmission wireless device may be configured to determine whether to perform the V2X control and/or data message transmission with an independent probability P for each idle resource unit.

In this connection, in one example, the V2X control and/or data message transmissions using two or more idle resource units on the specific subframe SF#N may be determined in relation to the probability. Then, the wireless device randomly selects one of the two or more idle resource units and performs the V2X control and/or data message transmission using the selected resource unit. Additionally or alternatively, the wireless device may be configured to randomly select one of the idle resource units having a relatively small average detected or sensed energy value and to perform the V2X control and/or data message transmission using the selected resource unit.

When the above defined [suggested method#2] is applied, in one example, a V2X transmission wireless device may be configured as follows; if the 'idle resource unit' does not exist in 'SF#N' subframe, V2X control and/or data message transmission may be omitted. Additionally or alternatively, one of all the basic resource units in the corresponding subframe SF#N may be randomly selected and the V2X control and/or data message transmission may be performed using this selected resource unit. Additionally or alternatively, one of the resource units having a relatively small average detected/sensed energy value among all the basic resource units in the corresponding subframe SF#N may randomly selected and the V2X control and/or data message transmission may be performed using the selected one.

Additionally or alternatively, the V2X transmission wireless device may be configured to determine, on a specific subframe SF#N, whether or not to perform the transmission of the V2X control and/or data message on the corresponding subframe SF#N with a pre-defined or signaled probability P (for example, the probability P may be configured or signaled to be 1). Upon determination that the V2X transmission wireless device actually performs V2X control and/or data message transmission on the corresponding subframe SF#N, one of all the basic resource units in the corresponding subframe SF#N may be randomly selected and the V2X control and/or data message transmission may be performed using this selected resource unit. Additionally or alternatively, one of the resource units having a relatively small average detected/sensed energy value among all the basic resource units in the corresponding subframe SF#N may randomly selected and the V2X control and/or data message transmission may be performed using the selected one.

In another example, the transmission probability value P per a set of basic resource units may be configured or signaled for the wireless device. Thus, the V2X transmission wireless device may be configured to determine whether to perform the V2X control and/or data message transmission using each set of the basic resource units with an independent probability P.

In one embodiment, transmission probability values may be configured independently, or partially or entirely differently between the sets of basic resource units.

Although the V2X control and/or data message transmission using a specific set of basic resource units are probabilistically determined, the final/actual V2X transmission may only be achieved if the corresponding specific set of basic resource units is determined to be a set of idle resource units.

In another example, when the [suggested method#2] described above is applied, the transmission probability values per a set of idle resource units (or the transmission probability value per a set of basic resource units) may be configured or signaled partially or completely differently or independently between V2X messages/information/service types, and/or V2X signals/channels with different priorities.

The transmission probability value per a set of idle resource units (or the transmission probability value per a set of basic resource units) may be configured or signaled to be relatively higher with respect to information on incident occurrence and/or event occurrence-based information or V2X synchronization signal with relatively high priority than with respect to other information or other V2X signal/channel with low priority.

[Suggested method#3] The V2X transmission wireless device may be configured to select a 'backoff value' (named as SEL_BACKVAL) within a backoff window size/range (which may be named "BACKOFF_SIZE" and may be represented, for example, as [0, B−1]) as derived/updated using predefined rules or pre-signaled on a specific subframe SF#K. Then, the V2X transmission wireless device may be configured to change a level to which the corresponding selected backoff value decreases based on the number of idle resource units in a subsequent subframe that includes or does not include the corresponding subframe SF#K.

For example, when the V2X transmission wireless device selects a backoff value (SEL_BACKVAL) of Q value ($0 \leq Q \leq B-1$) on the SF#N−1 subframe, Q−2 may be obtained in an SF#N subframe including two idle resource units.

In another example, if there is no idle resource unit in the specific subframe, exceptionally, the wireless device may be configured to reduce the backoff value (SEL_BACKVAL) based on a pre-defined or pre-signaled value (e.g., 1).

In another example, even if there are multiple idle resource units in a specific subframe, the wireless device may be configured to reduce the backoff value (SEL_BACKVAL) according to a predefined or signaled value (e.g., 1), irrespective of the number of idle resource units.

In still another example, even if an idle resource unit exists in a specific subframe, and when pre-defined or signaled information/channel/signal transmission cannot be performed (for example, if a V2X control message transmission cannot be performed and only a V2X data message transmission can be performed), the wireless device may be configured not to decrease the backoff value (SEL_BACKVAL).

In another example, although the V2X transmission wireless device has idle resource units in a specific subframe, backoff value (SEL_BACKVAL) reduction operation based on a number of idle resource units may be omitted in order to defer its V2X control and/or data message transmission.

When applying these rules, the V2X transmission wireless device deliberately assumes the number of idle resource units to be a value of '0' or removes determination based on the idle resource units in order to defer its V2X control and/or data message transmission.

When the above [suggested method#3] is applied, in one example, if there is no idle resource unit in the SF#N subframe with a value of '0' or a value of 'negative integer' of the backoff value (SEL_BACKVAL), the V2X transmission device may be configured as follows: the V2X control and/or data message transmission may be performed on idle resource units in the nearest subframe immediately after the SF#N subframe. Additionally or alternatively, it may be desirable to omit the V2X control and/or data message transmission on the 'SF#N' subframe. Additionally or alternatively, a backoff value (SEL_BACKVAL) may be re-selected from the backoff window size/range (BACKOFF_SIZE) of the SF#N subframe. Additionally or alternatively, one of the entire basic resource units of the 'SF#N' subframe may be randomly selected and then the V2X control and or data message transmission may be performed using the selected unit. Additionally and alternatively, one of the overall basic resource units of the 'SF#N' subframe with a relatively small average detected or sensed energy value may be randomly selected, and the selected unit may be used for the V2X control and/or data message transmission.

If the above [suggested method#3] is applied, in one example, when there are 'M' idle resource units in the SF#N subframe whose backoff value (SEL_BACKVAL) has a value of '0' or a value of 'negative integer', the V2X transmission device may be configured as follows: randomly selecting one of the 'M' idle resource units to perform V2X control and/or data message transmission, and/or randomly selecting one of the idle resource units having a relatively small average detected or sensed energy value to perform the V2X control and/or data message transmission.

In another example, when the above [suggested method#3] is applied, the V2X transmission device may be configured to independently select the backoff value *SEL_BACKVAL) for each basic resource unit set from the backoff window size/range (BACKOFF_SIZE) in the specific subframe SF#K.

The V2X device may be configured to reduce the backoff value (SEL_BACKVAL) of the basic resource unit set only if the corresponding set of the basic resource units is determined to be a set of idle resource units.

In another example, the V2X device may be configured to change the maximum value of the backoff window size/range (BACKOFF_SIZE) from which the backoff value (SEL_BACKVAL) is selected in the specific subframe SF#K, based on the number of idle resource units in the corresponding subframe SF#K.

For example, if there are 3 idle resource units in the SF#N subframe, the backoff window size/range (BACKOFF_SIZE) in the corresponding subframe SF#K is [0, 3-1], the maximum value of the backoff window size/range (BACKOFF_SIZE) is '2=3-1'.

When the above [suggested method#3] is applied, in one example, the backoff window size/range (BACKOFF_SIZE) or BACKOFF_SIZE maximum value/minimum value or SEL_BACKVAL reduction size may be partially or completely different or independently configured or signaled between the V2X message/information/service type and/or V2X signal/channel with different priorities.

The backoff window size/range (BACKOFF_SIZE) maximum value may be configured or signaled to be relatively lower with respect to information on incident occurrence and/or event occurrence-based information or V2X synchronization signal with relatively high priority than with respect to other information or other V2X signal/channel with low priority. Alternatively, the backoff value reduction may be configured or signaled to be relatively larger with respect to information on incident occurrence and/or event occurrence-based information or V2X synchronization signal with relatively high priority than with respect to other information or other V2X signal/channel with low priority.

[Suggested method#4] When the [suggested method#3] described above is applied, in one example, the backoff window size/range (BACKOFF_SIZE) '[0, B-1]' in the specific subframe SF#K may be changed/updated in accordance with some or all of the flowing rules.

(Rule#4-1) In one example, if the V2X control and/or data message transmission is performed using idle resource unit(s) that are more or equal to the pre-defined or signaled threshold value (for example, '1') in a pre-defined or signaled time interval/region, (in other words, if there are more idle resource units than the pre-defined or signaled threshold value (for example, '1') in a pre-defined or signaled time interval/region), the V2X device may be configured to reduce a maximum value of the backoff window size/range (BACKOFF_SIZE) in the 'SF#K' subframe to a (B-1)/W (e.g., 'W=2') or to increase the maximum value of the backoff window size/range (BACKOFF_SIZE) in the 'SF#K' subframe to a (B-1)*R (e.g., 'R=2').

The corresponding time interval/region may be set to the interval between SF#(K-T) and SF#(K-1) (for example, 'T' value is a positive integer equal to or greater than 1) or the interval between SF#(K-T1) and SF#(K-T2) (e.g., 'T1', 'T2' values may be configured as a positive integer greater than or equal to 1).

In one example, if the V2X control and/or data message transmission is performed using idle resource unit(s) that are more or equal to the pre-defined or signaled threshold value (for example, '1') in the pre-defined or signaled time interval/region, (in other words, if there are more idle resource units than the pre-defined or signaled threshold value (for example, '1') in the pre-defined or signaled time interval/region), the V2X device may be configured to increase the maximum value of the backoff window size/range (BACKOFF_SIZE) in the 'SF#K' subframe to a (B-1)*R (e.g., 'R=2') or reduce a maximum value of the backoff window size/range (BACKOFF_SIZE) in the 'SF#K' subframe to a (B-1)/W (e.g., 'W=2').

If the Rule#4-1 is applied, parameters (for example, 'W', 'R') used for changing/updating the maximum value of the backoff window size/range (BACKOFF_SIZE) may be configured partially or totally differently or independently between the V2X message/information/service type and/or V2X signal/channel with different priorities.

[Suggested method#5] When the [suggested method#3] described above is applied, in one example, only the V2X transmission wireless device satisfying some or all of the following conditions may be configured to select a backoff value from the backoff window size/range (BACKOFF_SIZE) ([0, B-1]) as derived/updated using the predefined rule, or as pre-signaled in the specific subframe SF#K.

Condition#5-1: V2X transmission wireless device with backoff value of '0' or 'negative integer' value.

Condition#5-2: V2X transmission wireless device actually performing the V2X control and/or data message transmission before the 'SF#K' subframe; and/or V2X transmission wireless device that omits the V2X control and/or data message transmission before the subframe 'SF#K' according a predefined rule.

When some or all of the proposed schemes (for example, [suggested method#1], [suggested method#2], [suggested method#3], [suggested method#4], and [suggested method#5]) are applied, the V2X transmission wireless device may be configured to perform the V2X control and/or data message transmission by performing the following procedure:

The PSCCH may be transmitted in one subframe or a plurality of pre-defined or pre-signaled subframes. One PRB may be used in each slot. The set of PRB candidates which may be used for PSCCH transmission in the first slot may be set to $\{PRB_{PSCCH,\ 0}, PRB_{PSCCH,\ 1}, \ldots, PRB_{PSCCH,\ N-1}\}$ which may be configured by an upper layer.

If the wireless device transmits the PSCCH using $PRB_{PSCCH,\ x}$ in the first slot of the subframe, and the PSSCH (physical sidelink shared channel), which is a sidelink shared channel is to be transmitted by the wireless device on the subframe, the following condition should be satisfied.

$0 < PRB_{PSSCH,\ start} - PRB_{PSCCH,\ x} < A$, or $0 < PRB_{PSCCH,\ x} - PRB_{PSSCH,\ end} < A$.

In the above relationship, $PRB_{PSSCH,\ start}$ denotes the smallest index among the indexes of PRBs used for PSSCH transmission, while $PRB_{PSSCH,\ end}$ indicate the largest index among the PRB indexes used for PSSCH transmission. "A" may be configured by the network or a predefined value.

The sidelink grant may include information indicating the SCI (sidelink control information) and the PSCCH transmission resource.

The wireless device with data to transmit may initiate a PSCCH transmission procedure. The wireless device randomly selects a backoff value from interval [1, CWmax]. The wireless device determines the SCI information excluding the resource block assignment field and determines the $L_{CRBs}$ value. In this connection, $L_{CRBs}$ value may refer to the number of consecutive resource blocks allocated to the PSSCH (physical sidelink shared channel).

Before starting the PSCCH transmission procedure, as long as all PRBs of all subframes are included in the resource pool, the wireless device assumes that all PRBs of all subframes are available.

The wireless device monitors the PSCCH candidates on the subframe n-k. That is, by monitoring each PSCCH candidate on the subframe n-k, the wireless device may receive SCIs for other wireless devices.

The wireless device considers that the PRB used for transmission of the PSSCH scheduled via one of the SCIs for the other wireless devices received on the subframe n-k is not-available.

If the subframe n is included in the PSCCH subframe pool indicating the candidate subframes that may be used for transmission of the PSCCH, and the PSCCH transmission using $PRB_{PSCCH, x}$ in the first slot of the subframe n does not use the unavailable PRB, that is, if $PRB_{PSCCH, x}$ is an available PRB, the SCI transmission having the specific resource bock assignment configuration based on the determined $L_{CRBs}$ on the subframe n does not use the unavailable PRB. When the subframe n is included in the PSSCH subframe pool, and the configuration of the PSSCH PRBs and the resource block assignment field satisfy the simultaneous transmission conditions of the PSSCH and the PSCCH, the wireless device considers that the configuration of the side link grant and the resource block assignment including $PRB_{PSCCH, x}$ for the PSCCH transmission resource is feasible.

Otherwise, the wireless device assumes that the configuration of the side link grant and the resource block assignment including $PRB_{PSCCH, x}$ for the PSCCH transmission resource is either unfeasible or feasible.

If there is at least one feasible side link grant, the wireless device reduces the backoff value by one.

When the backoff value is zero, the wireless device may transmit the PSCCH according to the feasible sidelink grant on the subframe n. If there is more than one feasible sidelink grant, then one of the a plurality of sidelink grants may be selected with an even probability.

Upon completion of the PSCCH transmission procedure, the wireless device may continue the PSSCH transmission procedure. After this, the procedure moves to a next subframe.

Figure 10:
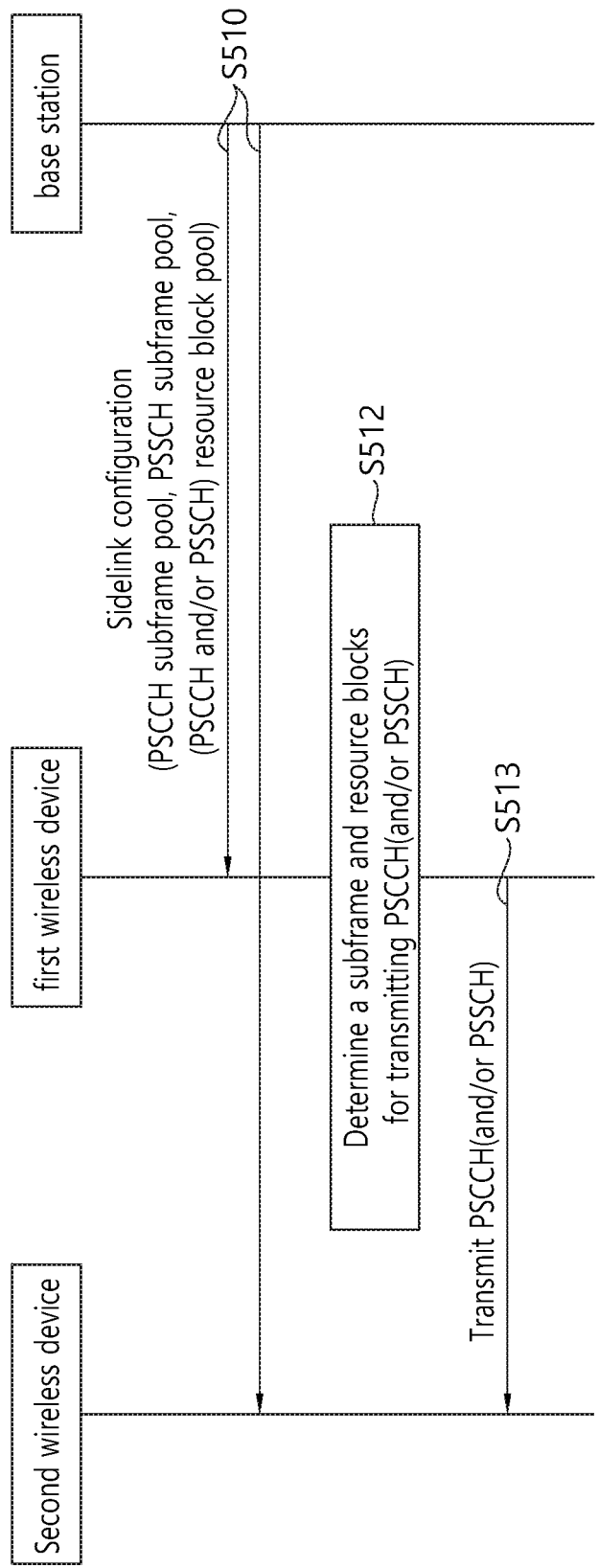
FIG. 10 illustrates signaling between a first wireless device and a base station in order to transmit a V2X message.

FIG. 10 illustrates signaling between a first wireless device and a base station in order to transmit a V2X message.

Referring to FIG. 10, the base station transmits a sidelink configuration to the first wireless device and the second wireless device at step S510.

The sidelink configuration may include information indicating the subframes that the wireless device may use to transmit the PSCCH, i.e., the PSCCH subframe pool. The PSCCH subframe pool information may be provided in a bitmap form. Further, the sidelink configuration may include information indicating the subframes that the wireless device may use to transmit the PSSCH, i.e., the PSSCH subframe pool. The PSSCH subframe pool information may be provided in bitmap form. Further, the sidelink configuration may also include information indicating a resource block that may be used for PSCCH and/or PSSCH transmission. All of information indicated by the PSCCH subframe pool, the PSSCH subframe pool, or the PSCCH and/or PSSCH resource block pool may not necessarily be included in the same sidelink configuration.

The first wireless device determines a subframe and a resource block used to transmit the PSCCH and/or the PSSCH based on the sidelink configuration at step S512. In this procedure, the first wireless device may use at least one of the above-mentioned suggested methods#1 to #5. In particular, when a plurality of idle resource units are given, at least one of the above-mentioned suggested methods#1 to #5 may be used to determine which idle resource unit is actually used.

The first wireless device transmits the PSCCH and/or the PSSCH to the second wireless device using the determined subframe and the resource block (S513). More specifically, the first wireless device may transmit a PSCCH (e.g., which may be interpreted by the SCI) to the second wireless device. After the PSCCH transmission, the first wireless device may transmit a PSSCH to the second device. Alternately, the first device may transmit the PSCCH and PSSCH to the second device on the same subframe.

It is obvious that one example of the proposed scheme described above may be included as one of the implementation methods of the present disclosure and, therefore, may be considered as a kind of proposed schemes. Further, the proposed schemes described above may be implemented independently, or may be implemented as a combination of some of the proposed schemes. In one example, the proposed scheme based on the 3GPP LTE/LTE-A system has been described for convenience of description in the present disclosure, but the range of the system to which the proposed scheme is applied is different from the 3GPP LTE/LTE-A system. In one example, the proposed schemes according to this disclosure may be extended to D2D communication. D2D communication may mean that a wireless device and another wireless device communicate using a direct wireless channel A wireless device may refer to a user's wireless device. A network device, such as a base station, may also be considered a wireless device if it transmits/receives signals according to a communication scheme between wireless devices.

Figure 11:
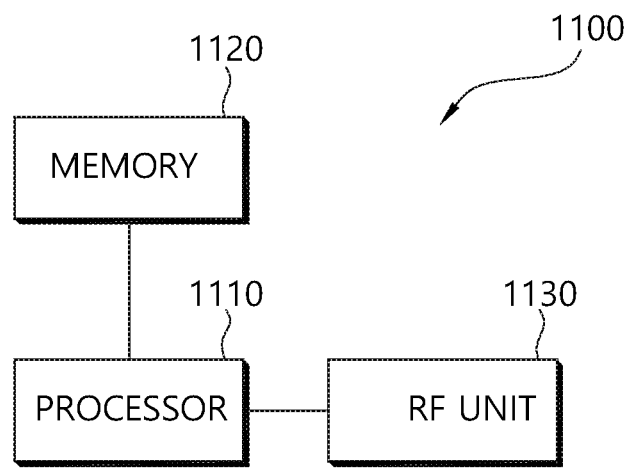
FIG. 11 is a block diagram illustrating a wireless device in which an embodiment of the present disclosure is implemented.

FIG. 11 is a block diagram illustrating a wireless device in which an embodiment of the present disclosure is implemented.

Referring to FIG. 11, a wireless device 1100 includes a processor 1110, a memory 1120, and a radio frequency (RF) unit 1130. Processor 1110 implements the above suggested functions, procedures and/or methods.

The RF unit 1130 is connected to the processor 1110 to transmit and receive radio signals.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method for performing a vehicle-to-everything, V2X, operation by a user equipment, UE, in a wireless communication system, the method comprising:
    receiving a signal informing a resource region;
    measuring energy on the resource region informed by the signal; and
    transmitting a V2X message using a resource excluding the resource region when the measured energy on the resource region is higher than a threshold.

2. The method of claim 1, wherein the UE receives the signal in a basic resource unit composed of at least one subframe.

3. The method of claim 1, wherein, through the signal, the UE identifies information about locations or a number of resources used for V2X data transmission of another UE.

4. A user equipment, UE, for performing a vehicle-to-everything, V2X, operation in a wireless communication system, the UE comprising:
- a RF, radio frequency, unit configured to transmit and receive a RF signal; and
- a processor operatively coupled to the RF unit,
- wherein the processor receives a signal informing a resource region,
- measures energy on the resource region informed by the signal, and
- transmits a V2X message using a resource excluding the resource region when the measured energy on the resource region is higher than a threshold.

5. The UE of claim 4, wherein the UE receives the signal in a basic resource unit composed of at least one subframe.

6. The UE of claim 4, wherein, through the signal, the UE identifies information about locations or a number of resources used for V2X data transmission of another UE.

* * * * *